United States Patent
Faulkner et al.

(10) Patent No.: US 11,432,466 B2
(45) Date of Patent: Sep. 6, 2022

(54) WINDROW SYSTEM WITH SPLIT CURTAINS AND METHOD THEREOF

(71) Applicant: DEERE & COMPANY, Moline, IL (US)

(72) Inventors: Christopher J. Faulkner, Eldridge, IA (US); Martin Rittershofer, East Moline, IL (US)

(73) Assignee: DEERE & COMPANY, Moline, IL (US)

( * ) Notice: Subject to any disclaimer, the term of this patent is extended or adjusted under 35 U.S.C. 154(b) by 309 days.

(21) Appl. No.: 16/746,061

(22) Filed: Jan. 17, 2020

(65) Prior Publication Data

US 2020/0396904 A1    Dec. 24, 2020

Related U.S. Application Data

(60) Provisional application No. 62/865,522, filed on Jun. 24, 2019.

(51) Int. Cl.
| | |
|---|---|
| *A01F 29/12* | (2006.01) |
| *A01D 41/12* | (2006.01) |
| *A01F 29/04* | (2006.01) |

(52) U.S. Cl.
CPC .......... *A01F 29/12* (2013.01); *A01D 41/1243* (2013.01); *A01F 29/04* (2013.01)

(58) Field of Classification Search
CPC ...... A01F 29/12; A01F 41/1243; A01F 29/04; A01F 12/40
See application file for complete search history.

(56) References Cited

U.S. PATENT DOCUMENTS

| | | | | | |
|---|---|---|---|---|---|
| 3,149,449 | A | * | 9/1964 | Mulder | A01F 12/40 56/192 |
| 9,894,837 | B2 | * | 2/2018 | Estock | A01D 43/06 |
| 2010/0311481 | A1 | * | 12/2010 | Ritter | A01F 12/40 460/112 |
| 2019/0090428 | A1 | * | 3/2019 | Rittershofer | A01F 12/442 |

(Continued)

FOREIGN PATENT DOCUMENTS

| | | | | | |
|---|---|---|---|---|---|
| CA | 2897880 | C | * | 9/2019 | ............ A01F 12/10 |
| DE | 19908111 | C1 | * | 7/2000 | ............ A01F 12/40 |
| DE | 102004014306 | A1 | | 10/2005 | |

(Continued)

*Primary Examiner* — Arpad Fabian-Kovacs
(74) *Attorney, Agent, or Firm* — Taft Stettinius & Hollister LLP; Stephen F. Rost (57) ABSTRACT

A windrow system of a combine includes a chopper and a spreader. The chopper includes a chopper housing having a roof and a rotor assembly positioned in the chopper housing, and the spreader is pivotably coupled to the chopper and includes a top surface and an impellor that is positioned below the top surface and includes one or more blades for rotatably conveying crop residue rearwardly and outwardly from the spreader. The windrow system also includes top segment coupled to a main body of the combine, a first curtain, and a second curtain having a portion thereof positioned outwardly of the first curtain. Each of the curtains are movable relative to the main body of the combine when the spreader and/or chopper move between at least one of wide and narrow positions, chopping and windrowing positions, and chopping and stowed positions.

20 Claims, 5 Drawing Sheets

(56) References Cited

U.S. PATENT DOCUMENTS

2019/0104681 A1 * 4/2019 Larson .................... A01F 12/18

FOREIGN PATENT DOCUMENTS

| DE | 202009003439 U1 | 8/2010 | |
|---|---|---|---|
| DE | 102006042970 B4 | 7/2014 | |
| EP | 0595382 A1 * | 5/1994 | ............. A01F 12/40 |
| EP | 2042018 A1 * | 4/2009 | ......... A01D 41/1243 |
| EP | 2138026 A1 * | 12/2009 | ......... A01D 41/1243 |
| EP | 3530097 A1 * | 8/2019 | ........... A01F 12/446 |
| EP | 3884762 A1 * | 9/2021 | ............. A01F 12/44 |
| WO | WO-2014118239 A1 * | 8/2014 | ............... A01D 61/00 |

\* cited by examiner

WINDROW SYSTEM WITH SPLIT CURTAINS AND METHOD THEREOF

RELATED APPLICATIONS

This application claims priority to U.S. Provisional Application Ser. No. 62/865,522, filed Jun. 24, 2019, the disclosure of which is hereby incorporated by reference in its entirety.

FIELD OF THE DISCLOSURE

The present disclosure relates to agricultural combines. More particularly, it relates to residue spreaders for agricultural combines. Even more particularly, the disclosure relates to windrow systems including powered residue spreaders extending from the rear of agricultural combines.

BACKGROUND OF THE DISCLOSURE

Modern combines harvest agricultural crops, separate grain from residue, and then spread the residue over the ground. The residue may consist of straw and chaff. It is beneficial to spread chaff evenly over the ground as the combine passes through the field harvesting crops. As the width of agricultural harvesting head's increase, it is more difficult to evenly spread the chaff over an increasingly greater width. For that reason, powered residue spreaders have been fixed to the residue outlets of the combines. These powered residue spreaders typically use rotating band like structures to disperse the residue widely side to side behind the combine. In some applications, it may be beneficial to separate the straw from the chaff. For example, it may be desirable to spread the chaff widely over the field, while arranging the straw in a more narrow windrow atop the chaff.

Windrowing may require a mechanism for forming a narrow row of straw or other residue resting atop the chaff. The arrangement a windrow-forming mechanism relative to other components of the combine may present challenges associated with various positions of the powered residue spreader.

SUMMARY

In an illustrative embodiment of the present disclosure, a windrow system of a combine includes a chopper including a chopper housing having a roof and a rotor assembly positioned in the chopper housing; a spreader pivotably coupled to the chopper and including a top surface and an impeller positioned below the top surface, with the impeller including one or more blades for rotatably conveying crop residue rearwardly and outwardly from the spreader; a mounting bracket positioned above the roof of the chopper housing; a straw-deflector plate positioned above the top surface of the spreader; a first curtain fixedly coupled between the mounting bracket and the roof of the chopper housing; and, a second curtain spaced apart from the first curtain and coupled between the straw-deflector plate and the top surface of the spreader.

In the illustrative embodiment, the second curtain includes a forward end and a rearward end, the first curtain includes a forward end and a rearward end, and the forward end of the second curtain is spaced outwardly from the rearward end of the first curtain. The forward end of the second curtain is positioned forwardly of the rearward end of the first curtain.

In the illustrative embodiment, the spreader is pivotable relative to the chopper between (i) a windrowing position in which the top surface of the spreader forms a first angle with the roof of the chopper housing, and (ii) a chopping position in which the top surface of the spreader forms a second angle with the roof of the chopper housing, and the second angle is less than the first angle. The second angle is about 16 degrees less than the first angle.

In the illustrative embodiment, the second curtain is coupled to the spreader at a pivot axis of the second curtain for rotation relative to the top surface of the spreader about the pivot axis, and the pivot axis of the second curtain is spaced apart from the forward end and the rearward end of the second curtain. The second curtain includes a top edge coupled to and fixed in a stationary position relative to the straw-deflector plate, and a bottom edge coupled to the spreader at the pivot axis of the second curtain for rotation relative to the top surface of the spreader about the pivot axis. The second curtain is movable between (i) a narrow position in which the rearward end of the second curtain is spaced apart a first distance from a first edge of the top surface of the spreader and (ii) a wide position in which the rearward end of the second curtain is spaced apart a second distance from the first edge of the top surface of the spreader, and the second distance is less than the first distance. The first curtain is fixed in a stationary position when the second curtain is moved between the narrow position and the wide position.

In the illustrative embodiment, the first curtain comprises a pair of first curtains spaced apart from each other and coupled between the mounting bracket and the roof of the chopper housing. The second curtain comprises a pair of second curtains spaced apart from and outwardly of the pair of first curtains and coupled between the straw-deflector plate and the top surface of the spreader.

In another illustrative embodiment of the present disclosure, a windrow system of a combine includes a chopper movable relative to a main body of the combine and including a chopper housing having a roof and a rotor assembly positioned in the housing; a spreader movable relative to a main body of the combine, coupled to the chopper, and including a top surface and an impeller positioned below the top surface, with the impeller including one or more blades for rotatably conveying crop residue rearwardly and outwardly from the spreader; a first member configured to be fixed relative to the main body of the combine; a first curtain coupled between the first member and the roof of the chopper housing; a second curtain spaced apart from the first curtain and coupled between the first member and the top surface of the spreader; wherein the spreader and the chopper and are movable relative to the main body of the combine from (i) at least one of a plurality operational positions, in which the first curtain extends a first distance between the first member and the roof of the chopper housing, to (ii) a stowed position, in which the first curtain extends a second distance between the first member and the roof of the chopper housing, and where the second distance is less than the first.

In the illustrative embodiment, the first member includes a mounting bracket positioned above the roof of the chopper; and a straw-deflector plate positioned above the top surface of the spreader, pivotably coupled to the mounting bracket, and fixable relative to the main body of the combine.

In the illustrative embodiment, the first curtain is substantially planar when the spreader and the chopper are in one of the plurality of operational positions, and the first curtain is non-planar when the spreader and the chopper are in the stowed position. The plurality operational positions includes (i) a windrowing position in which the second curtain extends a third distance between the straw-deflector plate and the top surface of the spreader, and (ii) a chopping position in which the second curtain extends a fourth distance between the straw-deflector plate and the top surface of the spreader, and the fourth distance is less than the third distance. When the spreader and the chopper are in the stowed position the second curtain extends a fifth distance between the straw-deflector plate and the top surface of the spreader, and the fifth distance is less than the fourth distance. When the spreader and the chopper are in the windrowing position the top surface of the spreader forms a first angle with the roof of the chopper housing, when the spreader and the chopper are in the chopping position the top surface of the spreader forms a second angle with the roof of the chopper housing, and the second angle is less than the first angle.

In yet another illustrative embodiment of the present disclosure, a method of moving a windrow system adapted for use at a rear portion of an agricultural combine includes positioning a spreader in a windrowing position relative to a chopper, wherein the spreader includes a top surface and an impeller, and the chopper includes a chopper housing and a rotor assembly surrounded by the chopper housing; and moving the chopper and the spreader relative to a mounting bracket, which is positioned above the roof of the chopper housing, from (i) the chopping position in which a first curtain extends a first distance between the mounting bracket and the chopper housing, to (ii) a stowed position in which the first curtain extends a second distance between the mounting bracket and the chopper housing; wherein the second distance is less than the first distance.

In the illustrative embodiment, the method includes moving the spreader from (i) a windrowing position in which the top surface of the spreader forms a first angle with a roof of the chopper housing to (ii) the chopping position in which the top surface of the spreader forms a second angle with the roof of the chopper housing that is less than the first angle. When the spreader is in the windrowing position the first curtain extends the first distance between the mounting bracket and the chopper housing. In the illustrative embodiment, moving the chopper and the spreader relative to a mounting bracket includes retracting a linear actuator coupled to the chopper to advance the spreader and the chopper toward the stowed position.

In the illustrative embodiment, the method further includes rotating the second curtain relative to the top surface of the spreader from (i) a narrow position in which the windrow system is configured to disseminate a windrow having a first width to (ii) a wide position in which the windrow system is configured to disseminate a windrow having a second width greater than the first width. The second curtain includes a forward end and a rearward end, the first curtain includes a forward end and a rearward end spaced inwardly of and apart from the forward end of the second curtain, and rotating the second curtain relative to the top surface of the spreader includes rotating the forward end of the second curtain relative to the rearward end of the first curtain.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
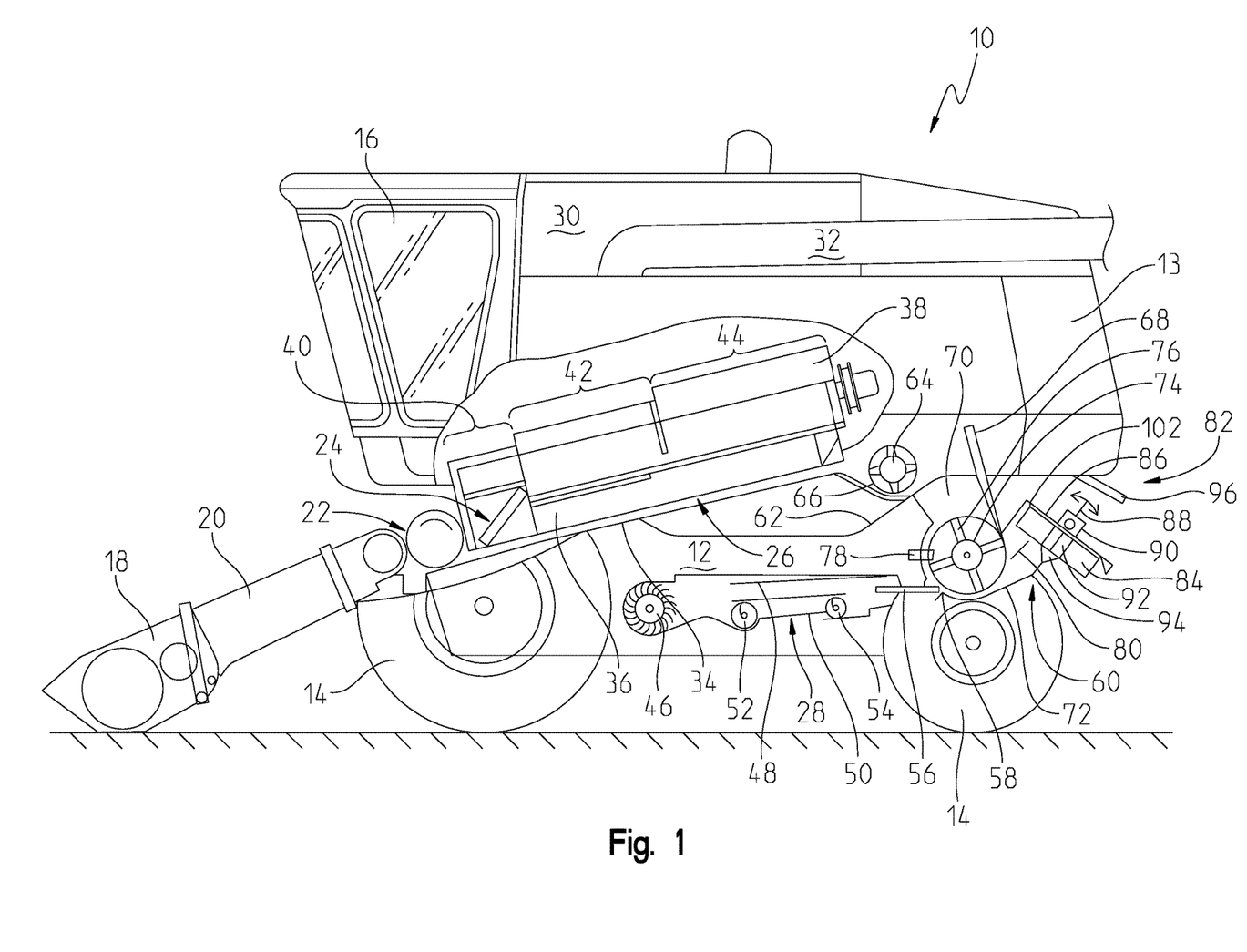
FIG. 1 is a side view of a combine having residue chopper and a residue spreader.

An example of an agricultural machine or combine 10 is illustrated in FIG. 1. Here, the agricultural machine 10 is shown with a chassis 12 with wheels 14 in contact with the ground. A main body 13 of the combine 10 is supported by the chassis 12. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls (not shown) for controlling the operation of the combine 10. A cutter head 18 is disposed at a forward end of the combine 10 and is used in order to harvest crop such as corn and to conduct it to a slope conveyor 20. The harvested crop is conducted by a guide drum 22 to a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn, chaff, and/or straw that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and straw and guides the clean corn over a screw conveyor 52 to an elevator for clean corn (not shown). The elevator for clean corn deposits the clean corn in a corn tank 30, as shown in FIG. 1. The clean corn in the corn tank 30 can be unloaded by means of an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by means of an oscillating sheet conveyor 56 to the rear and to a lower inlet 58 of a chopper rotor assembly 60.

The aforementioned blower 46 produces an air flow that carries much of the chaff, straw, and small particles to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and residue is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84, which extend radially, can be rotatably driven by a hydraulic motor 90 that is attached above an impeller sheet or an upper portion of the impeller 102 which is connected with the housing 72 of the chopper rotor assembly 60. At their radially inner ends, the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape. Straw may be conducted through a windrow plenum or windrow system defined by at least an a top surface of the impeller blowers and a top segment 96 (sometime called a first member or a top portion) of the windrow system extending from a rear portion of the combine.

Figure 2:
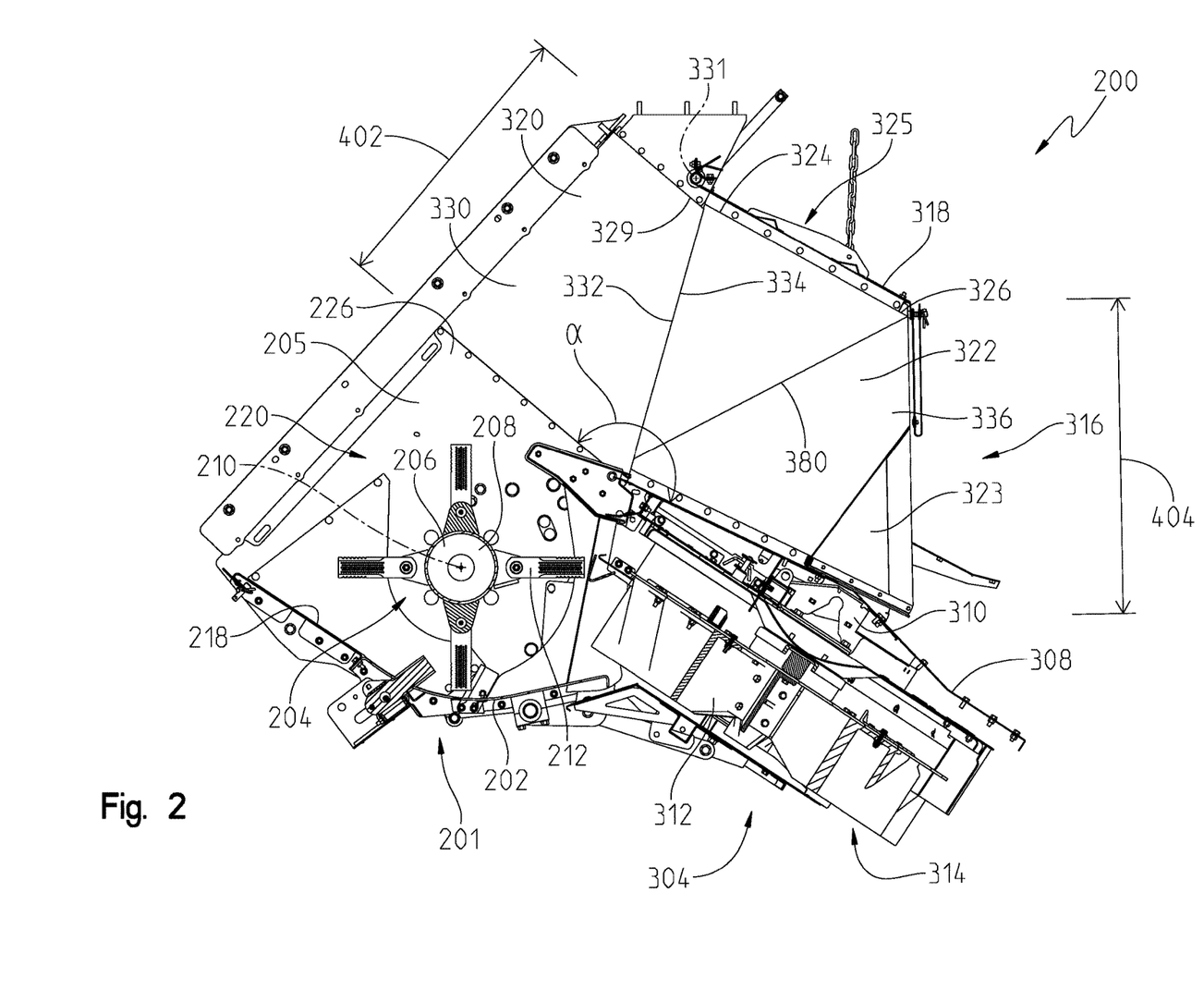
FIG. 2 is a section of a side view of a rear portion of a combine showing the spreader in a windrowing position relative to the chopper.

Referring to FIG. 2, a rear portion of a combine 200 is shown. Here, a chopper housing 202 and a chopper rotor assembly 204 are illustrated. The chopper housing 202 may be formed of a pair of opposing side walls 205. In addition to the side walls 205, the housing 202 may include a floor or inlet floor 218 and a chopper roof 226 spaced apart vertically from the floor 218. The inlet floor 218 may be angled or declined such that air is able to flow over the inlet floor 218 and into the chopper rotor assembly 204. The inlet floor 204 defines a portion of an inlet 220 to the chopper housing 202.

The chopper rotor assembly 204 may include a chopper rotor 206 for chopping the residue received from the cleaning system. The chopper rotor 206 may include a central hub 208 and a plurality of blades 212 coupled thereto and protruding radially therefrom. Each of the plurality of blades 212 may be spaced relative to one another in an arrangement along the width of the chopper rotor 206. The chopper rotor 206 is disposed within the chopper housing 202 and may rotate in a counterclockwise direction about a pivot axis 210. When residue enters the chopper housing 202, large pieces of residue fall downward into a gap between the rotor 206 and the floor 218 of the chopper housing 202. As the chopper rotor 206 rotates (counterclockwise in FIG. 2) it chops these large pieces of residue and throws them rearward into a residue spreader 304.

The residue spreader 304 may include a pair of impellers 314 located in a side-by-side arrangement and configured to be driven in rotation by motors 310. Each impeller includes a plurality of blades 312, and as the blades 312 rotate, they throw the chopped residue rearwardly and outwardly away from the spreader 304, whereupon the chopped residue or chaff falls in a substantially even pattern upon the ground. What is meant by outwardly is toward the right edge or left edge of the spreader (i.e., away from the center of the spreader). It should be noted that the chopped residue is propelled toward the underside of the residue spreader 304 for spreading, and not above a top surface 308 of the residue spreader 304. This describes how large, heavy residue or chaff, travels through the combine, into the chopper, is chopped, and is distributed over the ground.

Lighter residue, which may be referred to as straw, however, follows a different path through the chopper 206 and the spreader 304. Lighter residue is not carried to the bottom of the chopper 206 and through the chopper blades 312, but is light enough to be carried upward with the flow of air from the combine 10. This flow of air passes over a top portion of the chopper rotor 206 and between the blades 212 that extend outwardly from the chopper rotor 206. This lighter residue exits the housing 202 of the chopper rotor 206 above the spreader 304 and is carried across the top surface 308 of the spreader 304. Straw passes a through a windrow system 316 and is disseminated on the field or atop the chaff spread as the combine 10 travels in the forward operating direction.

As shown in FIG. 2, the windrow system 316 includes the chopper 201, the spreader 304, a top segment 325, a first curtain 320, and a second curtain 322. The chopper 201 and the spreader 304 are movable relative to the main body 13 of the combine 10. The chopper 201 includes the chopper housing 202 having the roof 226 and the rotor assembly 206 positioned in the housing 202, as described above. The spreader 304 is pivotably coupled to the chopper 201 at a rear portion of the chopper housing 202. The spreader 304 includes the top surface 308 and the impeller 314, as described above. The impeller 314 is positioned below the top surface 308 of the spreader 304 and includes the plurality of blades 312 for rotatably conveying crop residue rearwardly and outwardly from the spreader 304 to form the chaff spread.

The top segment 325 is fixed relative to the main body 13 of the combine 10 and includes a mounting bracket 328 and the straw-deflector plate 318. The mounting bracket 328 is positioned above and spaced apart from the roof 226 of the chopper 201. The straw-deflector plate 318 is pivotably coupled to the mounting bracket 328 and fixable relative to the main body 13 of the combine 10.

The straw-deflector plate 318 is positioned above and spaced apart from the top surface 308 of the spreader 304. The straw-deflector plate 318 is coupled to the main body 13 of the combine 10 that is supported by the chassis 12, such that the straw-deflector plate 318 may remain stationary when the spreader 304 and/or the chopper 201 is/are moved relative to the chassis 12. In some embodiments, the straw-deflector plate 318 is suspended at a first location via a chain from an engine deck (not shown) of the main body 13 and coupled at a second location to the mounting bracket 328 to fix the straw-deflector plate 318 relative to the main body 13 of the combine 10. The straw-deflector plate 318 includes a front end 324 and a rear end 326.

Similar to the straw-deflector plate 318, the mounting bracket 328 is coupled to the main body 13 of the combine 10 that is supported by the chassis 12, such that the mounting bracket 328 may remain stationary when the spreader 304 and/or the chopper 201 is/are moved relative to the chassis 12. In some embodiments, the mounting bracket 328 is fixedly coupled or fastened to an engine deck of the main body. As such, the straw-deflector plate 318 and the mounting bracket 328 may remain stationary relative to each other when the spreader 304 and/or the chopper 201 is/are moved relative to the chassis 12. In some embodiments, the mounting bracket 328 is triangular-shaped and includes a top side 327 coupled to the engine deck and a bottom corner 329 positioned opposite the top side 327. The front end 324 of the straw-deflector plate 318 is pivotably coupled to the mounting bracket 328 at a plate-pivot axis 331 extending through the bottom corner 329 of the mounting bracket 328.

Referring still to FIG. 2, it should be appreciated that the first curtain 320 is a single first curtain section included in a pair of first curtain sections. As such, the windrow system 316 includes a pair of first curtain sections 320 and 321 (see FIG. 3), that are spaced apart (or discrete) from each other and positioned on opposing sides of the rear portion of the combine 10. The first curtain section 320 is a mirror image of, but otherwise identical to, the first curtain section 321. As such, any description of a first curtain section applies with equal force to each of the first curtain sections 320, 321. Similarly, it should be appreciated that the second curtain section 322 is one second curtain section included in a pair of second curtains sections. As such the windrow system 316 includes a pair of second curtain sections 322 and 323 (see FIG. 3), that are spaced apart (or discrete) from each other and positioned on opposing sides of the rear portion 200 of the combine 10. The second curtain section 322 is a mirror image of, but otherwise identical to, the second curtain section 323. As such, any description of a second curtain section applies with equal force to each of the second curtains 322, 323.

In the illustrative embodiment, each curtain 320, 321, 322, 323 is made of a pliable material, such that the curtains are bendable and moveable without cracking or fracturing. Each curtain is formed by folding the forward end and the rearward end, respectively, over an elastic cords (for example, bungee cords). The curtains are stitched such that each end of each curtain encloses an elastic cord. As such, each curtain is biased toward a vertically-compressed state by the elastic cords.

Referring still to FIG. 2, the first curtain 320 is fixedly coupled between mounting bracket 328 and the roof 226 of the chopper housing 202. The second curtain 322 is pivotably coupled between the straw-deflector plate 318 and the top surface 308 of the spreader 304. The first curtain 320 includes a forward end 330 and a rearward end 332, and the second curtain 322 includes a forward end 334 and a rearward end 336.

Figure 3:
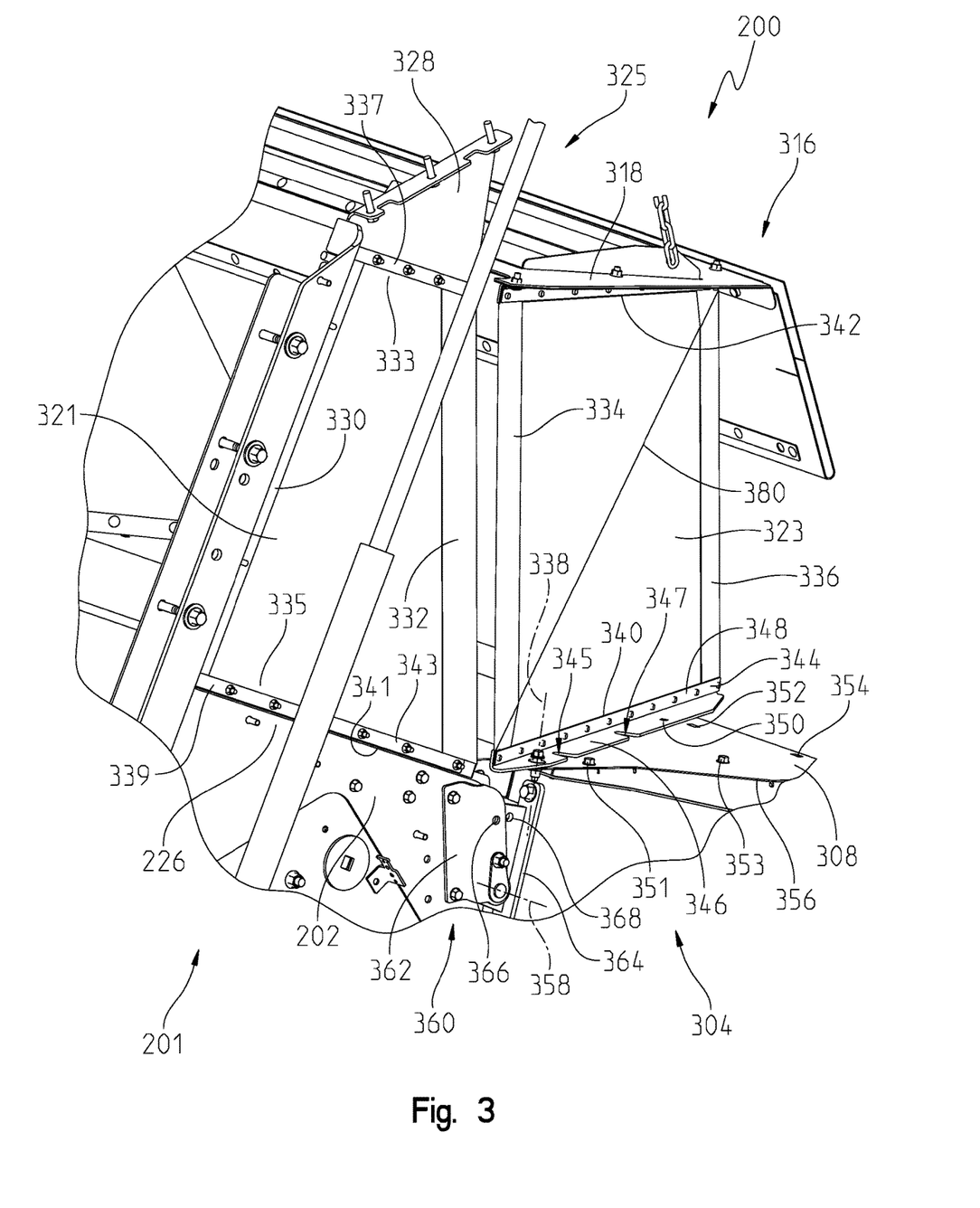
FIG. 3 is a perspective view of the rear portion of the combine of FIG. 2 showing a first curtain coupled to the chopper and a second curtain spaced apart from the first curtain and coupled to the spreader.

As shown in FIG. 3, the first curtain 321 includes a top edge 333 fixedly coupled to the mounting bracket 328 and a bottom edge 335 fixedly coupled to the roof 226 of the chopper housing 202. The top edge 333 is coupled to the mounting bracket 328 through a flat bracket 337. The flat bracket 337 includes a plurality of openings configured to receive a corresponding plurality of fasteners to secure the top edge 333 of the first curtain 321 to the mounting bracket 328. The bottom edge 335 of the of the first curtain 321 is fixedly coupled to the roof 226 of the chopper housing 202 through an L-shaped bracket 339. The L-shaped bracket 339 includes a first leg 341 fixedly coupled to the roof 226 of the chopper housing 202, and a second leg 343 fixedly coupled to the bottom edge 335 of the of the first curtain 321. Each leg 341, 343 of the L-shaped bracket 339 includes a plurality of openings configured to receive a corresponding plurality of fasteners to secure the bottom edge 335 of the first curtain 321 to the L-shaped bracket 339.

As shown in FIG. 3, the forward end 334 of the second curtain 323 is positioned outwardly of and spaced apart from the rearward end 332 of the first curtain 321. Further, the forward end 334 of the second curtain 322 is spaced apart from and positioned forwardly of the rearward end 332 of the first curtain 321. Such an arrangement of the second curtain 323 relative to the first curtain 321 allows the second curtain 323 to pivot or otherwise move relative to the first curtain 321 while the first curtain 321 remains stationary. The arrangement of the second curtain 323 relative to the first curtain 321 also prevents straw and other crop residue from flowing outwardly between the first and second curtains 321, 323.

The second curtain 323 includes a bottom edge 340 and a top edge 342. The top edge 342 is fixedly coupled to the straw-deflector plate 318, such that the top edge 342 is fixed in a stationary position relative to the straw-deflector plate 318. The bottom edge 340 of the second curtain 323 is pivotably coupled to the top surface 308 of the spreader 304 at a pivot axis 338 of the second curtain 323. The pivot axis 338 extends transversely to the top surface 308 and is spaced apart from the forward end 334 and the rearward end 336 of the second curtain 323. Thus, while the top edge 342 of the second curtain 323 is fixed relative to the straw-deflector plate 318, the bottom edge 340 is free to rotate. Because the second curtain 323 is made of a pliable material, at least a portion of the second curtain 323 is configured to rotate relative to the straw-deflector plate 318 and relative to the top surface 308 of the spreader 304.

As show in FIG. 3, the bottom edge 340 of the of the second curtain 323 is coupled to the top surface 308 of the spreader 304 through an L-shaped bracket 344. The L-shaped bracket 344 includes a first leg 346 pivotably coupled to the top surface 308 of the spreader 304, and a second leg 348 fixedly coupled to the bottom edge 340 of the of the second curtain 323. The second leg 348 of the L-shaped bracket 344 includes a plurality of openings configured to receive a corresponding plurality of fasteners to secure the L-shaped bracket 344 to the bottom edge 340 of the second curtain 323.

Referring still to FIG. 3, the first leg 346 of the L-shaped bracket 344 includes a locking-aperture 350. The top surface 308 of the spreader 304 includes an inner aperture 352 and an outer aperture 354 spaced outwardly of the inner aperture 352. The second curtain 323 is movable between a narrow position in which the locking-aperture 350 is aligned with the inner aperture 352 and a wide position in which the locking aperture 350 is aligned with the outer aperture 354. In the illustrative embodiment, the L-shaped bracket 344 defines a first slot 345 spaced apart from the forward end 334 of the second curtain 323 and a second slot 347 positioned rearwardly of the first slot 345. The top surface 308 of the spreader 304 includes a pair of stoppers 351, 353 configured to receive the first and second slots 345, 347, respectively, when the second curtain 323 is moved to the wide position. As such, the stoppers 351, 353 enter the slots 345, 347 and contact the L-shaped bracket 344 to prevent the second curtain 323 from pivoting outwardly beyond the stoppers 351, 353.

When the second curtain 323 is in the narrow position, the rearward end 336 of the second curtain 323 is spaced apart a first distance from a first edge 356 of the top surface 308 of the spreader 304. When the second curtain 323 is in the wide position, the rearward end 336 of the second curtain 323 is spaced apart a second distance from the first edge 356 of the top surface 308 of the spreader 304, and the second distance is less than the first distance. Because the first curtain 321 is discrete from the second curtain 323, the first curtain 321 is configured to remain in a stationary position, when the second curtain 323 is moved between the narrow and wide positions.

When straw passes through the windrow system 316 with the pair of second curtains 322, 323 in the narrow position, the windrow system 316 is configured to disseminate a windrow having a first width. When straw passes through the windrow system 316 with the pair of second curtains 322, 323 in the wide position, the windrow system 316 is configured to disseminate a windrow having a second width that is greater than the first width.

As shown in FIG. 3, the spreader 304 is pivotally coupled to the chopper 201 at a spreader-pivot axis 358, which extends transversely through a fastening assembly 360. The fastening assembly 360 includes a first bracket 362 fixedly coupled to the chopper housing 202 and a second bracket 364 fixedly coupled to the spreader 304. The first bracket 362 includes a first fastening-aperture 366, and the second bracket 364 includes a second fastening-aperture 368. The spreader 304 is pivotable relative to the chopper 201 between a windrowing position (see FIGS. 2 and 3), in which the first fastening-aperture 366 and the second fastening aperture 368 are spaced apart from one another, and a chopping position (see FIG. 4), in which the first fastening-aperture 366 and the second fastening aperture 368 are aligned with one another. The fastening apertures 366, 368 are configured to receive a fastener when the fastening apertures 366, 368 are aligned with each other to secure the spreader 304 in the chopping position.

Figure 4:
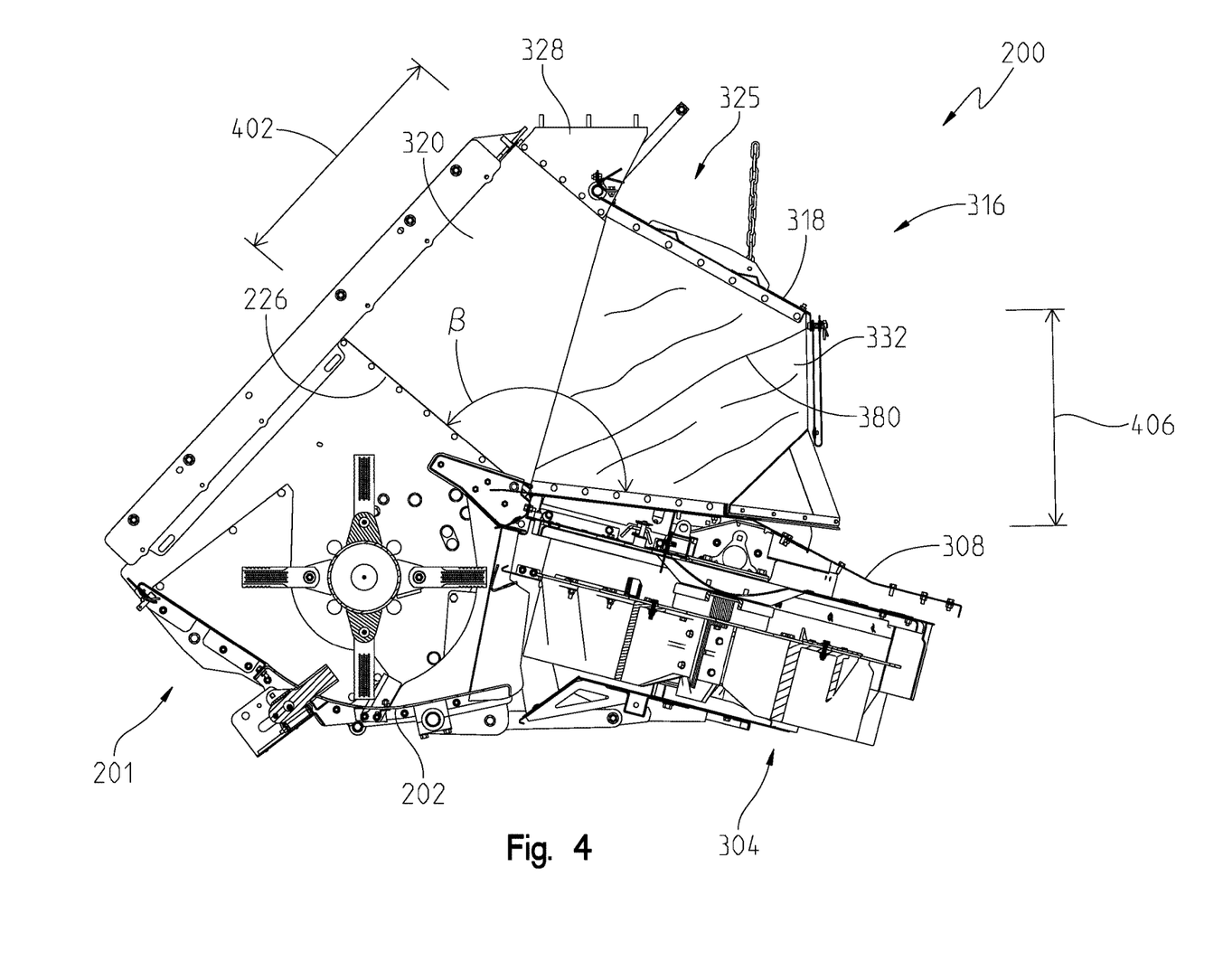
FIG. 4 is a section of a side view of the rear portion of the combine of FIG. 3 showing the spreader in a chopping position relative to the chopper.

As shown in FIG. 2, when the spreader 304 is in the windrowing position, the top surface 308 of the spreader 304 forms an angle α with the roof 226 of the chopper housing 202. As shown in FIG. 4, when the spreader 304 is in the chopping position, the top surface 308 of the spreader 304 forms an angle β with the roof 226 of the chopper housing 202. The angle β is less than the angle α. In some embodiments, the angle β is between about 10-30 degrees less than the angle α. In the illustrative embodiment, the angle β is about 16 degrees less than the angle α.

In some embodiments, the windrowing position and the chopping position may be referred to as operational positions. In the illustrative embodiment and as shown in FIGS. 2 and 4, when the spreader 304 is in one of the operational positions, the first curtain 320 is substantially planar and extends a distance 402 between the mounting plate 328 and the roof 226 of the chopper housing 202. As such, when the spreader 304 moves between the windrowing position and the chopping position the first curtain 320 is configured to remain in a stationary position. Unlike the first curtain 320, the second curtain 322 is reconfigured when the spreader 304 moves between the windrowing position and the chopping position.

As shown in FIG. 2, when the spreader 304 is in the windrowing position, the second curtain 322 extends a minimum distance 404 between the straw-deflector plate 318 and the top surface 308 of the spreader 304. As shown in FIG. 4, when the spreader 304 is in the chopping position, the second curtain 322 extends a minimum distance 406 between the straw-deflector plate 318 and the top surface 308 of the spreader 304. The distance 406 is less than the distance 404. As such, the second curtain 322 wrinkles or folds on itself when the spreader 304 is moved to the chopping position. Because the first curtain 320 is discrete from the second curtain 322, the first curtain 320 is configured to remain in a stationary position (and, in some embodiments, in planar form) when the second curtain 323 is moved between the windrowing and chopping positions.

Figure 5:
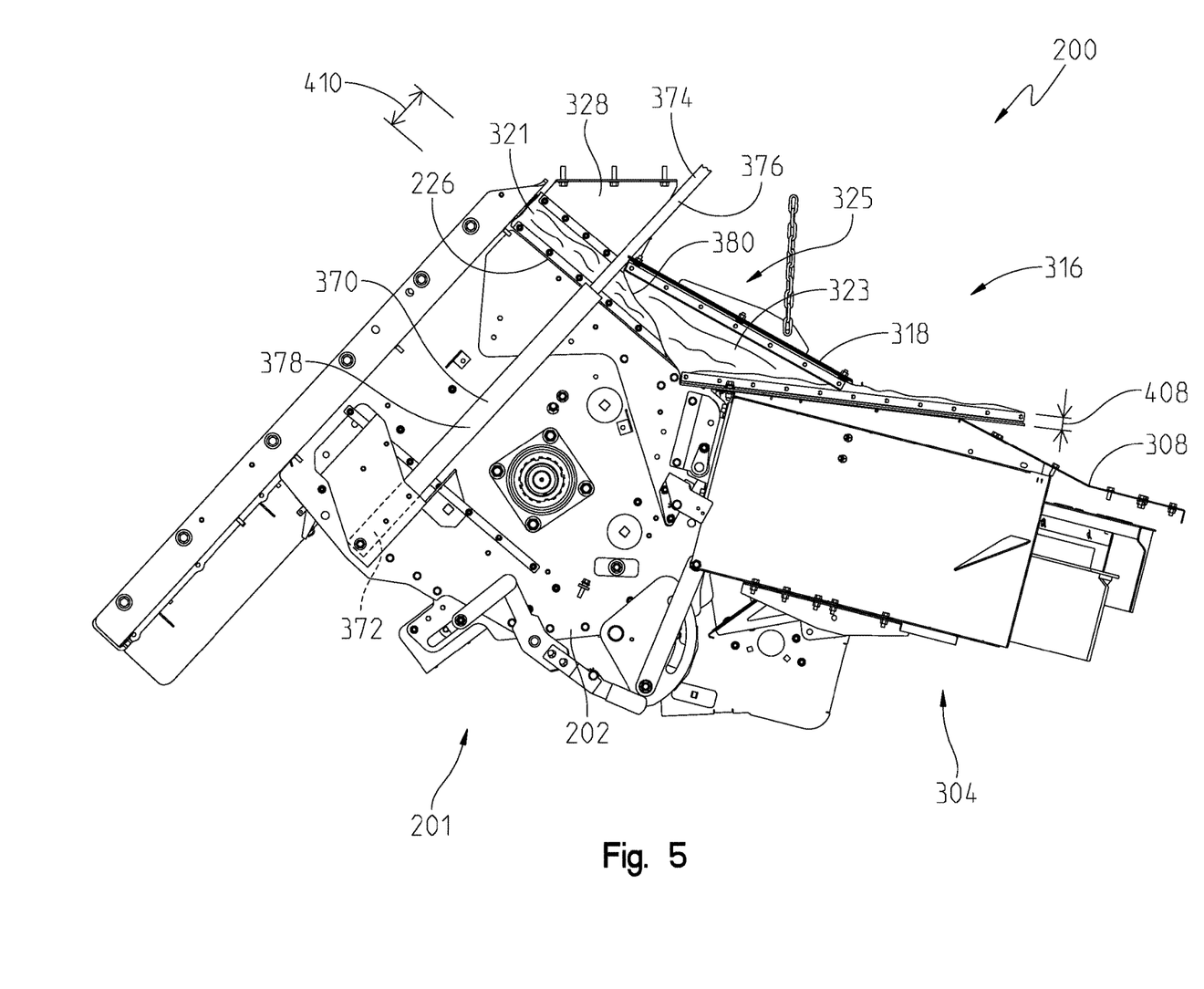
FIG. 5 a side view of the rear portion of the combine of FIGS. 3-4 showing the spreader and the chopper in a stowed position relative to a main body of the combine.

Referring now to FIG. 5, a linear actuator 370 is coupled at its first end 372 to the chopper housing 202 and at its second end 374 to the main body 13 of the combine 10. In the illustrative embodiment, the linear actuator 370 includes an inner cylinder 376 and an outer cylinder 378. The outer cylinder 378 is configured to slide relative to the inner cylinder 376 to contract and expand the linear actuator 370. Sliding motion of the outer cylinder 378 relative to the inner cylinder 376 moves the chopper 201 and the spreader 304 from the chopping position (see FIG. 4) to a stowed position (see FIG. 5).

As described above and shown in FIG. 4, when the spreader 304 is in the chopping position, the first curtain 320 extends a distance 402 between the mounting bracket 328 and the roof 226 of the chopper housing. As shown in FIG. 5, when the spreader 304 and the chopper 201 are in the stowed position, the first curtain 321 extends a distance 410 between the mounting bracket 328 and the roof 226 of the chopper housing 202, and the distance 410 is less than the distance 402. As such, the first curtain 321 wrinkles or folds on itself when the chopper 201 is moved to the stowed position.

As described above and shown in FIG. 4, when the spreader 304 is in the chopping position, the second curtain 322 extends a minimum distance 406 between the straw-deflector plate 318 and the top surface 308 of the spreader 304. As shown in FIG. 5, when the spreader 304 and the chopper 201 are in the stowed position, the second curtain 323 extends a minimum distance 408 between the straw-deflector plate 318 and the top surface 308 of the spreader 304, and the minimum distance 408 is less than the minimum distance 406. As such, the second curtain 323 wrinkles or folds on itself (beyond the wrinkling and folding of the chopping position) when the chopper 201 and the spreader 304 are moved from the chopping position to the stowed position.

As shown in FIG. 2, when the first curtain 320 and the second curtain 322 are outstretched, the curtains 320, 322 have geometric shapes, which have been found to facilitate desirable folding patterns. In the illustrative embodiment, the first and second curtains 320, 322 are substantially trapezoidal-shaped such that, when the curtains 320, 322 are outstretched (when the spreader is in the windrowing position), the top edge of each curtain is substantially parallel with the bottom edge of the respective curtain.

As shown in each of FIGS. 2-5, the second curtains 322, 323 include a predefined crease 380. As shown in FIG. 3, the crease 380 extends diagonally from the rearward end 336 at the top edge 342 to the forward end 334 at the bottom edge 340 of the second curtain 323. In the illustrative embodiment, as the second curtain 323 wrinkles or folds on itself, the second curtain 323 folds along the crease 380. Because the first curtain 321 is discrete from the second curtain 323, the first and second curtains 321, 323 are configured to wrinkle or crease independently of one another and thereby reduce the number of different stress patterns applied to a single curtain. Additionally, the discrete arrangement of the first and second curtains introduces less abstract wrinkling or folding patterns. These innovations in wrinkling and folding patterns along with the innovations in curtain shape reduce the stress on the curtains and prevent unnecessary wrinkling and folding.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A windrow system of a combine, comprising:
   a chopper including a chopper housing having a roof and a rotor assembly positioned in the chopper housing;
   a spreader pivotably coupled to the chopper and including a top surface and an impeller that is positioned below the top surface, with the impeller including one or more blades for rotatably conveying crop residue rearwardly and outwardly from the spreader;
   a straw-deflector plate positioned above the top surface of the spreader;
   a mounting bracket positioned above the roof of the chopper housing;
   a first curtain fixedly coupled between the mounting bracket and the roof of the chopper housing; and,
   a second curtain spaced apart from the first curtain and coupled between the straw-deflector plate and the top surface of the spreader.

2. The windrow system of claim 1, wherein:
   the second curtain includes a forward end and a rearward end,
   the first curtain includes a forward end and a rearward end, and
   the forward end of the second curtain is spaced outwardly from the rearward end of the first curtain.

3. The windrow system of claim 2, wherein the forward end of the second curtain is positioned forwardly of the rearward end of the first curtain.

4. The windrow system of claim 2, wherein:
   the spreader is pivotable relative to the chopper between (i) a windrowing position in which the top surface of the spreader forms a first angle with the roof of the chopper housing, and (ii) a chopping position in which the top surface of the spreader forms a second angle with the chopper roof of the chopper housing, and
   the second angle is less than the first angle.

5. The windrow system of claim 4, wherein the second angle is between about 10 degrees and 30 degrees less than the first angle.

6. The windrow system of claim 2, wherein:
   the second curtain is coupled to the spreader at a pivot axis of the second curtain for rotation relative to the top surface of the spreader about the pivot axis, and
   the pivot axis of the second curtain is spaced apart from the forward end and the rearward end of the second curtain.

7. The windrow system of claim 6, wherein the second curtain includes a top edge coupled to and fixed in a stationary position relative to the straw-deflector plate, and a bottom edge coupled to the spreader at the pivot axis of the second curtain for rotation relative to the top surface of the spreader about the pivot axis.

8. The windrow system of claim 2, wherein:
   the second curtain is movable between (i) a narrow position in which the rearward end of the second curtain is spaced apart a first distance from a first edge of the top surface of the spreader and (ii) a wide position in which the rearward end of the second curtain is spaced apart a second distance from the first edge of the top surface of the spreader, and
   the second distance is less than the first distance.

9. The windrow system of claim 1, wherein:
   the first curtain comprises a pair of first curtain sections spaced apart from each other and coupled between the mounting bracket and the roof of the chopper housing; and,
   the second curtain comprises a pair of second curtain sections spaced apart from and outwardly of the pair of first curtains and coupled between the straw-deflector plate and the top surface of the spreader.

10. A windrow system of a combine, comprising:
    a chopper movable relative to a main body of the combine and including a chopper housing having a roof and a rotor assembly positioned in the chopper housing;
    a spreader movable relative to the main body of the combine, and including a top surface and an impeller positioned below the top surface, wherein the impeller includes one or more blades for rotatably conveying crop residue rearwardly and outwardly from the spreader;
    a top segment positioned above the roof of the chopper housing and above the top surface of the spreader and coupled to the main body of the combine;
    a first curtain coupled between the top segment and the roof of the chopper housing;
    a second curtain spaced apart from the first curtain and coupled between the top segment of the windrow system and the top surface of the spreader;
    wherein the spreader and the chopper and are movable relative to the main body of the combine from (i) at least one of a plurality operational positions, in which the first curtain extends a first distance between the top segment and the roof of the chopper housing, to (ii) a stowed position, in which the first curtain extends a second distance between the top segment and the roof of the chopper housing, and where the second distance is less than the first distance.

11. The windrow system of claim 10, wherein the top segment includes:

a mounting bracket positioned above the roof of the chopper; and a straw-deflector plate positioned above the top surface of the spreader, pivotably coupled to the mounting bracket, and fixable relative to the main body of the combine.

12. The windrow system of claim 10, wherein:

wherein the plurality operational positions includes (i) a windrowing position in which the second curtain extends a third distance between the top segment of the windrow system and the top surface of the spreader, and (ii) a chopping position in which the second curtain extends a fourth distance between the top segment of the windrow system and the top surface of the spreader, and the fourth distance is less than the third distance.

13. The windrow system of claim 12, wherein:

when the spreader and the chopper are in the stowed position the second curtain extends a fifth distance between the top segment of the windrow system and the top surface of the spreader, and the fifth distance is less than the fourth distance.

14. The windrow system of claim 12, wherein:

when the spreader is in the windrowing position the top surface of the spreader forms a first angle with the roof of the chopper housing, when the spreader is in the chopping position the top surface of the spreader forms a second angle with the roof of the chopper housing, and the second angle is less than the first angle.

15. A method of moving a windrow system adapted for use at a rear portion of combine, comprising:

positioning a spreader in a chopping position relative to a chopper, wherein the spreader includes a top surface and an impeller, and the chopper includes a chopper housing and a rotor assembly surrounded by the chopper housing; and moving the chopper and the spreader relative to a mounting bracket, which is positioned above the roof of the chopper housing, from (i) the chopping position in which a first curtain extends a first distance between the mounting bracket and the chopper housing, to (ii) a stowed position in which the first curtain extends a second distance between the mounting bracket and the chopper housing;

wherein the second distance is less than the first distance.

16. The method of claim 15, further comprising:

moving the spreader from (i) a windrowing position in which the top surface of the spreader forms a first angle with a roof of the chopper housing to (ii) the chopping position in which the top surface of the spreader forms a second angle with the roof of the chopper housing that is less than the first angle.

17. The method of claim 16, wherein when the spreader is in the windrowing position the first curtain extends the first distance between the mounting bracket and the chopper housing.

18. The method of claim 15, wherein moving the chopper and the spreader relative to a mounting bracket includes contracting a linear actuator coupled to the chopper to advance the spreader and the chopper toward the stowed position.

19. The method of claim 15, further comprising:

rotating the second curtain relative to the top surface of the spreader from (i) a first position in which the windrow system is configured to disseminate a windrow having a first width to (ii) a second position in which the windrow system is configured to disseminate a windrow having a second width greater than the first width.

20. The windrow system of claim 19, wherein:

the second curtain includes a forward end and a rearward end, the first curtain includes a forward end and a rearward end spaced inwardly of and apart from the forward end of the second curtain, and rotating the second curtain relative to the top surface of the spreader includes rotating the forward end of the second curtain relative to the rearward end of the first curtain.

* * * * *